United States Patent Office 3,272,648
Patented Sept. 13, 1966

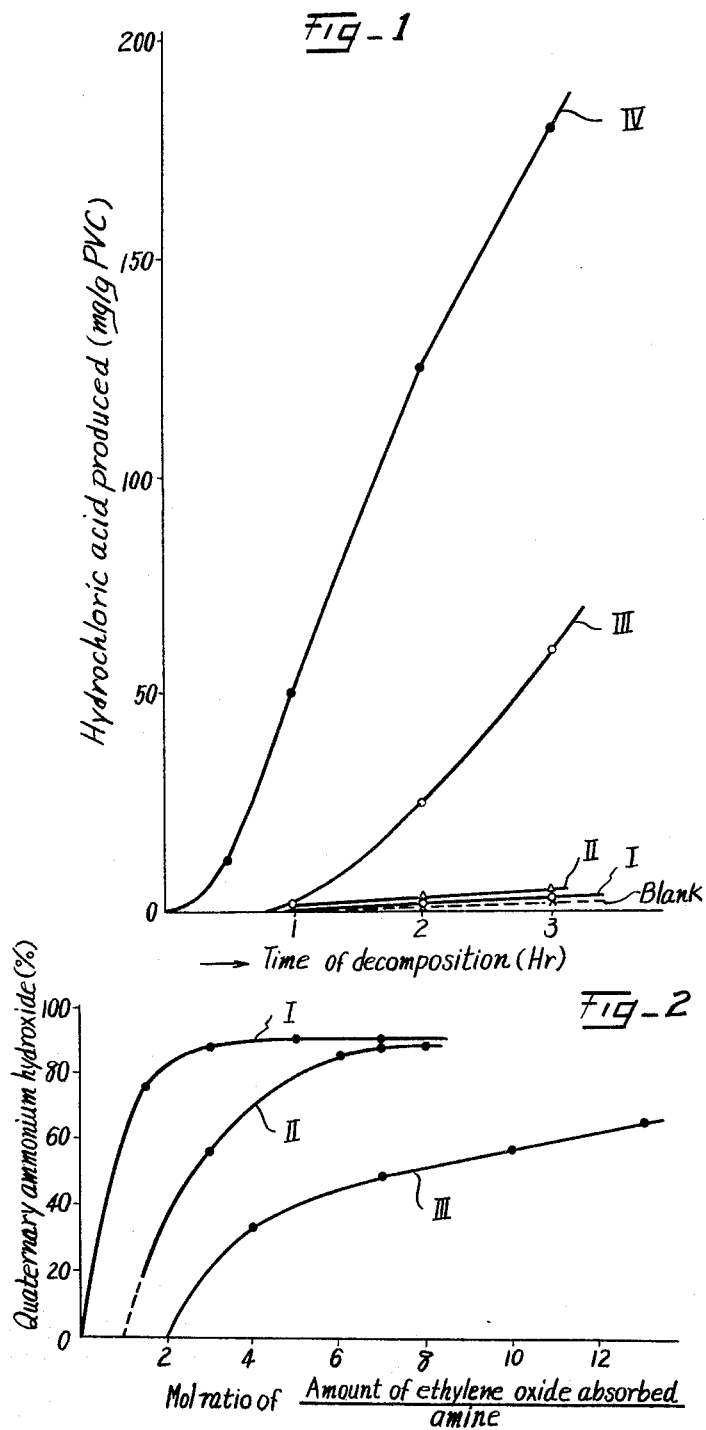

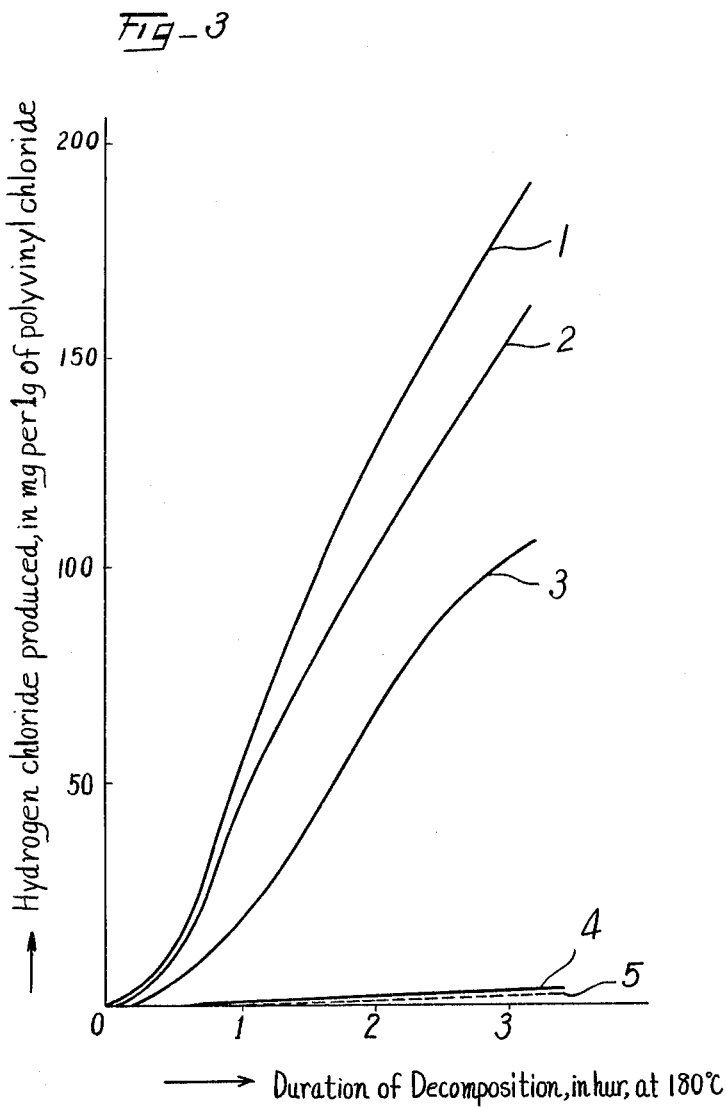

3,272,648
ANTISTATIC TREATMENT WITH A QUATERNARY AMMONIUM PERHALOGENATE AND PRODUCTS THEREOF
Takashi Yamamoto, Amagasaki, Japan, assignor to Nippon Oils and Fats Company Limited, Tokyo, Japan
Filed Oct. 4, 1965, Ser. No. 492,566
3 Claims. (Cl. 117—139.5)

This application is a continuation-in-part of my application Ser. No. 282,945, filed May 24, 1963.

This invention relates to the antistatic treatment of high molecular materials and the product thereof. More particularly the invention relates to the method of conditioning a material or article which, in a dry state, normally tends to accumulate static charges of electricity thereon, whereby this tendency is minimized or obviated, and to the treated materials or articles, for instance, textile materials in fiber, fabric or other form, plate materials, e.g., those used in making gramophone records etc.

High molecular materials have a high electric resistivity and are intended to be charged with static electricity occurred by frictional contact and rubbing and attract dust and dirt in the air and become dirty. Particularly, plastic material produces spark during its treatment and persons handling such material are often subjected to troublesome electrical shocks.

The gramophone records made of plastic material attract on the surface thereof dust and dirt owing to the static electricity occurred, which results in an occurrence of noise during playing of the record, a shortage of the life of record and stylus, and also a deformation of the sound tracks.

The treatment of the invention is effected by applying to the high molecular materials, a solution of a quaternary ammonium perhalogenate represented by the following general formula

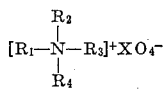

wherein X represents a halogen, $R_1$ is selected from the group consisting of aliphatic hydrocarbon, halogen substituted aliphatic hydrocarbon, amido, and N-substituted amido radicals having at least 6 carbon atoms, preferably from 6 to 28 carbon atoms, $R_2$, $R_3$ and $R_4$ represent hydrogen and alkyl radicals having from 1 to 4 carbon atoms, and hydroxyalkyl radicals.

Illustrative examples of radicals represented by $R_1$ are aliphatic hydrocarbon radicals such as hexyl, heptyl, octyl, octenyl, nonyl, decyl, decenyl, undecyl, undecenyl, dodecyl, tridecyl, tridecenyl, tetradecyl, tetradecenyl, hexadecyl, hexadecenyl, heptadecyl, heptadecenyl, octadecyl, octadecenyl, the residues of behemic acid and the like; a halogen substituted aliphatic hydrocarbon radicals such as mono- and poly halogenated aliphatic hydrocarbon radicals, alkylbenzene groups and the like; and amido radicals RCONH— in which R is any of the above exemplified aliphatic radicals, and N-substituent is an alkyl group such as ethyl, propyl, butyl, hexyl and the like.

Examples of $R_2$, $R_3$ and $R_4$ in addition to hydrogen, are alkyl radicals such as methyl, ethyl, propyl, isopropyl, n-butyl, sec.-butyl, tert.-butyl, hydroxyethyl, hydroxypropyl, 2-hydroxypropyl, hydroxy (polyethoxy)ethyl, and the like.

The high molecular materials to which the quaternary ammonium perhalogenate according to the invention may be applied include natural and synthetic fibers, resin, rubber, leather or paper.

The high molecular materials treated with a quaternary ammonium perhalogenate according to this invention have heat resistance properties which are not decreased even when it is molded while being heated or subjected to a high temperature. In order to give to the high molecular material the anti-static property according to the present invention, it is particularly advantageous to add the quaternary ammonium salt to the high molecular material by means of conventional impregnating, spraying, and blending treatments such that the high molecular material contains 0.2–15% of the quaternary ammonium perhalogenate. The anti-static property may desirably be given to the high molecular material by blending it with the quaternary ammonium perhalogenate. The quaternary ammonium perhalogenate may be impregnated in the fibers, fabrics etc., and may be blended with or coated on worked articles such as plate, sheet etc.

In case of giving the anti-static property to the fibers, the fibers are immersed in an aqueous solution having a suitable concentration of the quaternary ammonium perhalogenate or a solution of a solvent such as methanol, ethanol, acetone, benzene etc. In case of giving the anti-static property to resins such as plastic etc., the resin in powder or pellet form is blended with a solution of the quaternary ammonium perhalogenate with the aid of rolls, a mixer etc. and then molded in a conventional mold. It is advantageous to produce a resin material blended with the product according to the invention.

In accordance with the invention, the high molecular material becomes highly heat resistant without changing color even when subjected to high temperature treatment. The anti-static property of the high molecular weight polymeric material is superior to that obtained through the use of a conventional product and permanent in effect such that it is not decreased even when it is subjected to wind and rain, contact, friction, water washing etc.

If a fabric is treated as above described, it becomes not only anti-static in property but also soft and smooth, which results in an improvement in texture. It has been found that the anti-charging effect of the fabric is not decreased even though the fabric is washed five times successively nor is the texture altered.

The effect of the quaternary ammonium salt according to the present invention and that of the conventional quaternary ammonium salt both added to the high molecular material respectively, on the heat resisting property of the latter will now be compared. Polyvinyl chloride is used as the high molecular material.

The test is carried out based on ASTM-D-793-49, i.e. the amount of hydrochloric acid decomposed from the polyvinyl chloride containing 0.03 milli mol of the quaternary ammonium salt per 1 g. PVC at 160° C. is measured from hour to hour. I to IV in FIG. 1 represent quaternary ammonium salts listed in the following Table 1.

Table 1

| No. | Products | Chemical formulas |
|---|---|---|
| I | Product according to the invention. | $C_{17}H_{35}CONHC_2H_4N^{\oplus}(CH_3)_2C_2H_4OH \cdot ClO_4^{\ominus}$ |
| II | ----do---- | $C_{12}H_{25}N^{\oplus}(CH_3)_2C_2H_4OH \cdot ClO_4^{\ominus}$ |
| III | Conventional product. | $C_{17}H_{35}CONHC_3H_6N^{\oplus}(CH_3)_2C_2H_4OH \cdot NO_3^{\ominus}$ |
| IV | ----do---- | $C_{12}H_{25}N^{\oplus}(CH_3)_3 \cdot Cl^{\ominus}$ |

As can be seen from FIG. 1, the more hydrochloric acid is produced the more PVC is decomposed. The conventional products III and IV speed up the decomposition of PVC, whilst the products I and II according to the invention do not accelerate the decomposition of PVC. This fact means that addition of the anti-static agent according to the present invention does not degrade the heat resistant property of PVC.

How to blend the quaternary ammonium perhalogenate with the high molecular material for the purpose of preventing accumulation of the charge on the high molecular material will now be explained in detail. As the high molecular material, use is made of molded products and fibers. For the purpose of giving the anti-static property to the molded products, a moldable material is blended with the quatrnary ammonium salt by the following method.

The quaternary ammonium perhalogenate according to the invention is dissolved in an organic solvent preferably a relatively low boiling point or in water and the solution thus obtained is uniformly coated on the moldable material. If desired, the solvent is evaporated by drying, to occlude air bubbles from the subsequently molded product. Such drying process may be carried out at a lower temperature within a shorter time if use is made of a solvent having a boiling point less than than 100° C.

The moldable material to which is added the quaternary ammonium salt as above mentioned is molded at a suitable treating temperature to obtain a molded product having the anti-static property.

The treating temperature for PVC is 150–170° C., for polystyrene 180–220° C., and for vinyl chloride-vinyl acetate copolymer 130–150° C.

For such plastics, the quaternary ammonium salt is coated on the surface of the plastic to form a continuous electric conductive film which serves to conduct away the static charge occurring on the film. The quaternary ammonium salt contains a substitution radical having such affinity that it can be secured to the surface of the resin and can not be removed by friction, contact, wind and rain etc.

Fiber may be immersed in the quaternary ammonium salt solution or such solution may be sprayed onto the fiber. If the fiber thus treated is heated at 50–100° C., an anti-static property is obtained, which results in a decrease of the electric resistance on the surface of the fiber from $10^{12}\Omega$ for non-treated fiber to about $10^{6}\Omega$. A synthetic fiber having a permanent anti-charging property may also be obtained by the blending process. For example, PVC fiber may be spun by using a spinning solution mixed with a solution of the quaternary ammonium salt in benzene such that the fiber contains 0.2–15% of the quaternary ammonium salt. Molten spinning thread may be spun by directly adding thereto the pulverized quaternary ammonium salt. The reason why the above mentioned blending process can be performed is that the product according to the invention is excellent in heat stabilizing property, so that the heat resistant property of the high molecular material treated with the above product can not be degraded. Thus, the product according to the invention renders it possible by mere addition thereof to the high molecular material and to the worked product thereof to give the anticharging property to the latter without giving any inconvenient property, i.e. without degrading color, tensile strength, chemical resisting property, and resistance against bacteria of the latter.

The methods of producing the quaternary ammonium salt containing perhalogen acid anion as the anion are as follows. An organic amine and an alkylene oxide are brought together in the presence of water or an organic solvent and the quaternary ammonium hydroxide or the quaternary ammonium alkoxide thus obtained is neutralized continuously with perhalogen acid, or a quaternary ammonium salt is treated with sodium perhalogenate (or potassium) in nonhydrous solvent, or a quaternary ammonium hydroride is neutralized with perhalogen acid.

The organic amine is preferable an aliphatic amine and may be primary, secondary or tertiary.

The reaction may be carried out at a temperature of about 30–100° C. for ½–6 hours. More particularly, the organic amine is caused to react with a lower alkylene oxide of about 2–4 carbon atoms in the presence of a solvent to produce the quaternary ammonium hydroxide or the quaternary ammonium alkoxide. The quaternary ammonium hydroxide or alkoxide may be ascertained by means of a suitable indicating agent such as thymolphthalein or of pH meter. Immediately upon indication of quaternary ammonium hydroxide or alkoxide formation, it is neutralized with the acid continuously as it forms from the reaction of the amine and the alkylene oxide. For example, dimethyl dodecyl amine dissolved in alcohol is caused to react with ethyleneoxide. Then, a deflection of the pH meter indicates production of the quaternary ammonium hydroxide. Immediately thereafter, perhalogen acid is dropped on the quaternary ammonium hydroxide thus produced to neutralize the latter. The reaction including the neutralization, is conducted continuously thereby precluding by product glycol formation and insuring producing the desired product with a yield of 100%. Curves showing relations between the quaternary ammonium hydroxide and a mol ratio between ethylene oxide absorbed and an organic amine are illustrated in FIG. 2. Curve I illustrates the case in which dimethyl dodecyl amine is used as the organic amine, curve II illustrates the case in which methyl dodecyl amine is used as the organic amine, and curve III illustrates the case in which dodecyl amine is used as the organic amine. The reaction temperature is 65–70° C. In the case of the curves I and II, the rate of producing the quaternary ammonium hydroxide shown by the following Equation 1 reaches to an equilibrium state at 90%, after which only the reaction shown by the following Equation 3 occurs. In the case of the curve III, the rate of producing the quaternary ammonium hydroxide is in the order of 60%.

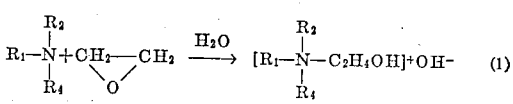

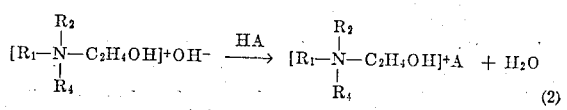

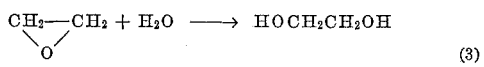

$$CH_2\text{---}CH_2 + H_2O \longrightarrow HOCH_2CH_2OH \quad (3)$$

The quaternary ammonium hydroxide thus produced is neutralized with the perhalogen acid according to Equation 2. About 10% of amine (the rate for amine fed) in case of the curves I and II and 40% of amine (also the rate for amine fed) in case of the curve III are mixed as non-reaction product with the product obtained.

In the method according to the invention, the quaternary ammonium hydroxide is immediately and continuously subjected to neutralization as it is formed with the perhalogen acid, the reactions of the Equations 1 and 2 continuously and simultaneously proceeding. The continued presence of the quaternary ammonium hydroxide, which might induce the reaction of the Equation 3 in the reaction system is thus avoided. Thus, the reaction of the Equation 3 is prevented from occurring and the reaction of the Equations 1 and 2 are completed.

Thus, the method makes it possible to readily carry out the reactions of the Equations 1 and 2 to obtain the quaternary ammonium perhalogenate in substantially 100% yield in the absence of non-reacted amine and by-product glycol formation.

The method of production of quaternary ammonium perhalogenate will be illustrated as follows:

(1) 21.4 g. (0.1 mol) of dimethyl dodecyl amine is dissolved in 70% ethanol. The mixture thus obtained is added with ethylene oxide at a temperature of 50–70° C. The quaternary ammonium hydroxide thus obtained is neutralized continuously as it is formed with 20% perchloric acid aqueous solution to produce the product II shown in the Table 1. The above reaction can be shown by the following equations.

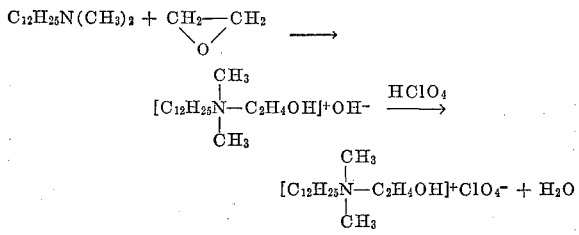

If use is made of stearamide ethyl dimethyl amine in place of dimethyl dodecyl amine the product I in the Table 1 can be obtained.

(2) 21.4 g. (0.1 mol) of dimethyl dodecyl amine is dissolved in the same amount of ethanol as in the Example 1 and the mixture thus obtained is added with 45 g. of 20% perchloric acid. The product thus obtained is quaternized by ethylene oxide and subsequently added continuously with 5 g. of 20% perchloric acid to obtain the product II shown in the Table 1.

The experimental results on the product according to the invention applied to PVC plates will now be explained with reference to the following examples.

*Example 1.*—Hard polyvinyl chloride:

PVC (manufactured by Japan Zeon Co., Ltd.,
$\overline{p}=800$) _____ g__ 100
Stabilizing agent, dibutyl tin maleate _____ g__ 3
Quaternary ammonium salt _____ mmol__ 3

(The quaternary ammonium salts are I, II, III and IV listed in the Table 1).

The above four compositions are fully mixed and then subjected to roll mixing treatment at 170° C. for 10 minutes and subsequently pressed into plates each having a thickness of 1 mm. Various properties of the PVC plates thus obtained are as follows:

(1) Color of PVC plate.

*Table 2*

| Product | I | II | III | IV | Blank |
|---|---|---|---|---|---|
| Colour | No | No | Brown | Dark brown | No |

As can be seen from the above Table 2, the conventional products III and IV result in coloring on the worked plate, whilst the products I and II according to the invention have excellent property of obviating such coloring.

Various properties of PVC plate treated with the quaternary ammonium salts having $CH_3COO^\ominus$ (V), $I^\ominus$ (VI), $NO_3^\ominus$ (VII) instead of perhalogen acid anion as an anion in the product II shown in the Table 1 are shown in Table 3.

*Table 3*

| Anion | Product | Color of worked plate |
|---|---|---|
| $CH_3COO^\ominus$ | V | Dark brown. |
| $I^\ominus$ | VI | Black. |
| $NO_3^\ominus$ | VII | Brown. |

Contrary to the above, the quaternary ammonium salt according to the invention and having a perhalogen acid anion when applied to the PVC plate produces no change in color and thus provides a novel product showing no color change. The quaternary ammonium salts having $FO_4^\ominus$, $BrO_4^\ominus$, and $IO_4^\ominus$ as an anion instead of $ClO_4^\ominus$ are found to have the same effect as in the case of $ClO_4^\ominus$.

(2) Heat resistant property of PVC plate (at 180° C.).

Table 4 shows the test results of the heat resistant property of PVC plates heated at 180° C. in an oven.

*Table 4*

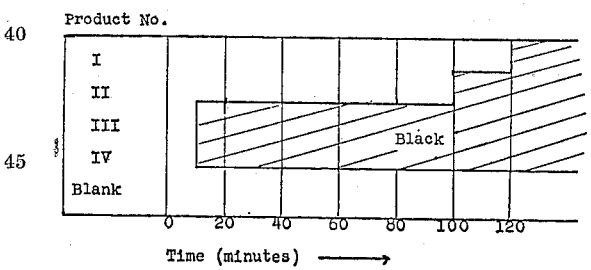

As can be seen from Table 4, the PVC plates treated with the conventional products III, IV become blackened at 180° C. for 10 minutes, whilst the PVC plates treated with the products I, II according to the invention are not blackened at the same temperature for the same time duration and show an excellent heat resistant property. If a stabilizing agent other than the dibutyltin maleate of Example 3 is used, the PVC plate treated with the conventional products still becomes blackened at 180° C. for 10 minutes, whilst the heat resistant property of the PVC plate treated with the products according to the invention is not influenced by such different stabilizing agent. The heat resistant property of the PVC plate treated with the products according to the invention however is superior when the tin-containing stabilizer is used.

(3) Anti-static effect for PVC plate and permanence thereof.

The PVC plate is put in a vessel having a constant temperature and humidity at 20° C. and 60 R.H., respectively, after the temperature and humidity have been adjusted for 50 hours, and then the surface resistivity and charge occurred on the plate due to friction are measured.

More particularly, the surface resistivity in Ω and the static charge in V are measured when the PVC plate is brought into frictional contact for 200 times/min. with a nylon tape stretched under a constant weight. Both values of the surface resistivity and the charge should preferably be small. Water washing of the PVC plate is carried out as a measure of permanence of the anti-static effect. The PVC plate is washed by water at 20° C. flowing with a rate of 2 lit./min. for 5 hours and the rate of decrease of the anti-static effect is observed. The rate of decrease of the anti-static effect for the PVC plate treated with the products according to the invention is less than that treated with the conventional products. This fact shows that the quaternary ammonium salt containing a perhalogen acid anion has a suitable mutual solubility, so that the quaternary ammonium salt is fixed to the surface of the resin and is not to be washed away.

The results of above test are shown in Table 5.

*Table 5*

| Property | Surface resistivity (Ω) | Charge occurred by friction (V) | |
|---|---|---|---|
| | | Before washing | After washing |
| Product: | | | |
| I | 1×10$^7$ | 30 | 200 |
| II | 2×10$^7$ | 50 | 300 |
| III | 7×10$^7$ | 80 | 700 |
| IV | 1×10$^8$ | 100 | 800 |
| Blank | More than 10$^{12}$ | 3,000 | |

*Example 2.*—PVC comprising soft compositions such as 100 g. of PVC, 50 g. of DOP, g. of dibutylin maleate, and 1.5 g. of quaternary ammonium salt (effective component) is formed into a sheet and the effect thereof is measured. The quaternary ammonium salts applied are I and III shown in the Table 1.

The treating conditions are as follows: The above compositions are blended by means of roll at 150° C. for 5 minutes, and finally pressed into a sheet under 70 atmospheres for 3 minutes. The color of the sheets thus obtained and the heat resistant property thereof at 180° C. are shown in Table 6. The anti-static effect is shown in Table 7.

*Table 6.*—Color change of PVC sheet and its heat resistnat property (at 180° C.)

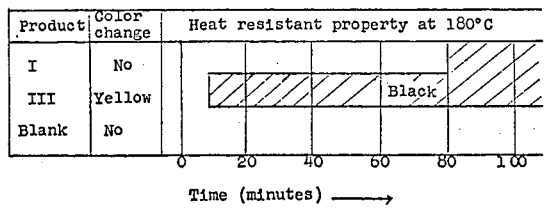

*Table 7.*—Anti-static effect of PVC sheet

| Product | Charge occurred by friction (V) | |
|---|---|---|
| | Before water washing | After water washing |
| I | 10 | 25 |
| III | 10 | 35 |
| Blank | 700 | 800 |

As can be seen from the above Tables 6 and 7, the product according to the invention and having ClO$_4$ anion as an anion gives to the PVC sheet an excellent heat resistant property and anti-static effect.

*Example 3.*—Application of the quaternary ammonium salt to vinyl chloride-vinyl acetate copolymer.

The quaternary ammonium salt I is blended with a record material, i.e. vinyl chloride-vinyl acetate copolymer ($\bar{p}$=450, content of PVAC is 12%) and formed into a plate. In this case, use is made of 3 g. of dibutyltin maleate as a stabilizing agent and 1.2 g. of the product I according to the invention per 100 g. of the resin. The treating conditions are as follows: The compositions are rolled at 135° C. for 5 minutes and pressed into a plate under 10 atmospheres at 150° C. and 1 minute and under 100 atmospheres at 150° C. for 1 minute. The color of the plate thus obtained and the heat resistant property at 150° C. are shown in Table 8. The anti-static effect is shown in Table 9.

*Table 8.*—Color change and heat resistant property of copolymer plate

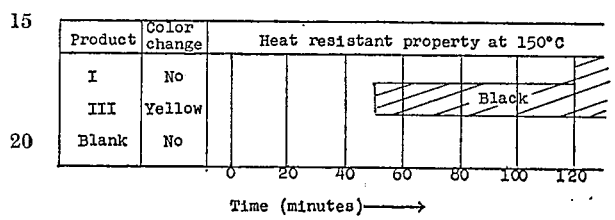

*Table 9.*—Anti-static effect of copolymer plate

| Product | Charge occurred by friction (V) | |
|---|---|---|
| | Before water washing | After water washing |
| I | 140 | 350 |
| III | 200 | 600 |
| Blank | 2,400 | 2,500 |

*Example 4.*—Application of the quaternary ammonium salt to polystyrol.

Polystyrol in pellet form is blended with 1.2 parts of the product I per 100 parts resin and the mixture thus obtained is rolled at 200° C. for 10 minutes and pressed into a plate under 10 atmospheres at 200° C. for 1 minute. The charge occurred on the polystyrol plate due to friction is 200 v., whilst the charge of blank is 2,500 v. This fact shows that addition of the product I to the polystyrol plate prevents charging on the polystyrol plate.

*Example 5.*—Application of the quaternary ammonium salt to synthetic fibers.

1 g. of tetron fiber and/or nylon fiber both completely washed are immersed in 10% aqueous solution of the product I according to the invention. The fibers are picked up and are squeezed to the double weight of the fibers, and then dried at 70° C. for one hour. The temperature and humidity of the fibers are adjusted to 20° C. and 60 R.H., respectively, and then the electrical resistance of the fibers is measured.

The fibers are washed repeatedly at 40° C. per 10 minutes with the aid of 2% aqueous solution of alkylbenzene sodium sulfonate and susbequently the change of the anti-static effect of the fibers is measured, the results being shown in Table 10.

*Table 10.*—Anti-charging effect (Ω)

| Fiber | After treatment | Number of washing | | | | |
|---|---|---|---|---|---|---|
| | | 1 | 2 | 3 | 4 | 5 |
| Nylon | 2×10$^6$ | 3×10$^8$ | 6×10$^8$ | 2×10$^9$ | 8×10$^9$ | 6×10$^{10}$ |
| Tetron | 2×10$^6$ | 3.5×10$^8$ | 8×10$^8$ | 1×10$^9$ | 7×10$^9$ | 3×10$^{10}$ |

Blank: Less than 10$^{12}$.

As can be seen from the above Table 10, the anti-static effect of the fibers is maintained even after the five washing treatments. This is a novel fact which has never been attained by the conventional quaternary ammonium salts.

It will be obvious that the invention is not restricted to the examples described above and that those skilled in the art may apply many variations within the scope of the invention.

In order to show the substantial improvement as anti-static agents for high molecular weight polymeric materials of the quaternary ammonium perhalogenates of the present invention over the quaternary ammonium compounds of the prior art, I conducted or caused to be conducted the following experiments:

EXPERIMENT I

Heat stability

Six quaternary ammonium compounds, as reported in Table 11, were employed in the heat stability testing of this experiment. Compounds 1–4 inclusive represent prior art salts while compounds 5 and 6 represent salts in accordance with the disclosure and claims of above identified application. Five samples of each compound were tested, one each at decomposition times of 0.5, 1, 1.5, 2 and 3 hours. Testing was conducted in the following manner:

One milli mol of each sample was weighed precisely in a weighing cup of 30 mm. diameter and 20 mm. depth, and then heated in air for its prescribed period of time in an electric furnace at 180° C. Each heated sample was then dissolved in water so as to provide 100 ml. of aqueous solution thereof. Thereafter, the amount of sample remaining undecomposed was determined by titrating 20 ml. of said aqueous solution was $N/30$ sodium tetraphenylboron using methylorange as an indicator. The amount of amine produced during said heating process was determined by extracting 20 ml. of said aqueous solution with ether on the alkaline side and titrating the extract thus obtained with $N/20$ perchloric acid using crystal violet as an indicator. The amount of the quaternary ammonium salt remaining undecomposed was then determined by subtracting the amount of amine produced from the sum of the undecomposed sample and amine produced. Finally, the rate in percent of heat decomposition was determined as follows:

$$\text{Rate (percent)} = \frac{\left(\begin{array}{c}\text{Initial Weight}\\ \text{of sample}\end{array}\right) - \left(\begin{array}{c}\text{Weight of undecomposed}\\ \text{sample}\end{array}\right)}{\text{Initial weight of sample}} \times 100$$

Results appear in Table 11.

*Table 11.*—Rate of heat decomposition (percent)

| Compound No. | Compound | Duration of heating (hrs.) | | | | |
|---|---|---|---|---|---|---|
| | | 0.5 | 1.0 | 1.5 | 2.0 | 3.0 |
| 1 | $C_{17}H_{35}CONHC_2H_4N(CH_3)_2C_2H_4OH \cdot Cl$ | 11.3 | 20.1 | 48.0 | 90.0 | |
| 2 | $C_{17}H_{35}CONHC_3H_6N(CH_3)_2C_2H_4OH \cdot Cl$ | 1.3 | 8.0 | 31.9 | 87.0 | 100 |
| 3 | $C_{17}H_{35}CONHC_3H_6N(CH_3)_2C_2H_4OH \cdot NO_3$ | 2.0 | 10.6 | 39.1 | 73.4 | 80.4 |
| 4 | $C_{11}H_{23}CONHC_3H_6N(CH_3)_2C_2H_4OH \cdot Cl$ | 13.1 | 15.9 | 68.5 | 88.3 | 87.8 |
| 5 | $C_{11}H_{23}CONHC_3H_6N(CH_3)_2C_2H_4OH \cdot ClO_4$ | 14.4 | 20.1 | 30.7 | 32.1 | 37.7 |
| 6 | $C_{17}H_{35}CONHC_3H_6N(CH_3)_2C_2H_4OH \cdot ClO_4$ | 20.3 | 29.8 | 31.7 | 42.2 | 43.2 |

The data of Table 11 clearly illustrate the superiority of the compounds of the above defined application as represented by compounds 5 and 6. The rate at which compounds 5 and 6 decompose noticeably slows down after 1.0 hour whereas for the prior art compounds as represented by compounds 1–4 inclusive it noticeably speeds up. After 3 hours, the rate of decomposition for compound 1 is so great that no measurement can be made while for compound 2 it is 100%. The rate for compounds 3 and 4 at 3 hours approaches 100%. On the other hand, the rates for compounds 5 and 6 at 3 hours are 37.7% and 42.2%, respectively. Comparing the prior art compounds 1–4 with compounds 5 and 6, it is readily apparent that even the best prior art compounds, i.e., compounds 3 and 4, have a decomposition rate at 3 hours which is 100% faster than compounds 5 and 6. The significance of the data of Table 11 is that compounds 5 and 6 will not give any undesirable dyeing effects for all practical purposes even when uniformly kneaded into conventional synthetic resins, whereas the same cannot be said for compounds 1–4. Accordingly, compounds 5 and 6 can be employed as anti-static agents in situations where compounds 1–4 inclusive would be totally unsuited.

EXPERIMENT II

Stability of resinous materials 0.03 milli mol samples of the compounds listed in Table 12 are incorporated into 1 g. samples of polyvinyl chloride and the resultant compositions subjected to 180° C. for the prescribed period of time as set forth in the table. Each composition was then tested along with a polyvinyl chloride blank according to ASTM–D–793–49 to determine the amount of hydrogen chloride produced, this being a measure of the accelerating affect each compound has on the decomposition of the polyvinyl chloride. Results appear in Table 12.

*Table 12.*—HCl released (mg.)

| Compound No. | Compound | Duration of heating (hrs.) | | |
|---|---|---|---|---|
| | | 1.0 | 2.0 | 3 |
| 1 | $C_{12}H_{25}N(CH_3)_2C_2H_4OH \cdot Cl$ | 50 | 125 | 180 |
| 2 | $C_{12}H_{25}N(CH_3)_2C_2H_4OH \cdot NO_3$ | 45 | 105 | 155 |
| 3 | $[C_{12}H_{25}N(CH_3)_2C_2H_4OH]_2 \cdot SO_4$ | 18 | 65 | 100 |
| 4 | $C_{12}H_{25}N(CH_3)_2C_2H_4OH \cdot ClO_4$ | 2 | 4 | 5 |
| 5 | Blank | 0 | 2 | 4 |

It is quite apparent from the data of Table 12 that compound 4, the compound in accordance with the above identified application, has little, if any, heat degrading effect on polyvinyl chloride. The rate of hydrogen chloride release, which is a measure of decomposition, is substantially the same for the sample of polyvinyl chloride containing compound 4 as it was for the polyvinyl chloride blank. In contrast, the prior art compounds 1, 2 and 3 are shown by the data of Table 12 to have a serious accelerating affect on the decomposition of polyvinyl chloride. The data of Table 12 are graphically illustrated in the attached drawing (FIG. 3).

EXPERIMENT III

Coloring of polyvinyl chloride plate

Samples of the compounds of Table 13 were mixed with uncoloured polyvinyl chloride according to the following recipe:

PVC (manufactured by Japan Zeon Ltd., $\bar{p}=800$) grams__ 100
Dibutyltin maleate (stabilizing agent) _____do____ 3
Compound of Table 13 _____mmol__ 3

The resulting compositions were then roll mixed at 170° C. for 10 minutes and then pressed into plates 1 mm. in thickness. The color of the resultant plate as compared to each other and to a polyvinyl chloride blank is reported in Table 13.

*Table 13*

| Compound No. | Compound | Color |
|---|---|---|
| 1 | $C_{17}H_{35}CONHC_2H_4N(CH_3)_2C_2H_4OH \cdot ClO_4$ | None. |
| 2 | $C_{17}H_{35}CONHC_3H_6N(CH_3)_2C_2H_4OH \cdot NO_3$ | Brown. |
| 3 | $C_{12}H_{25}N(CH_3)_2C_2H_4OH \cdot ClO_4$ | None. |
| 4 | $C_{12}H_{25}N(CH_3)_3 \cdot Cl$ | Dark brown. |
| 5 | $C_{12}H_{25}N(CH_3)_2C_2H_4OH \cdot I$ | Black. |
| 6 | $C_{12}H_{25}N(CH_3)_2C_2H_4OH \cdot NO_3$ | Brown. |
| 7 | $C_{12}H_{25}N(CH_3)_2C_2H_4OH \cdot OOCCH_3$ | Dark brown. |
| 8 | Blank | None. |

The data of Table 13 illustrates that compounds 1 and 3, in accordance with the above identified application, do not, as contrasted to prior art compounds 2 and 4–7, adversely affect the color of polyvinyl chloride when worked therein to form pressed plates.

EXPERIMENT IV

*Anti-static effect*

The polyvinyl chloride plates containing compounds 1–4 of Table 14 were tested, along with a polyvinyl chloride blank for static charge (V). Each plate was brought into frictional contact 200 times in one minute with a nylon tape stretched under a constant weight. After measuring the static charge on each plate, they were each washed for five hours with water at 20° C. flowing at a rate of 2 liters/min. after which the static charge of each plate was again measured. Results appear in Table 14.

*Table 14*

| Compound No. | Compound | Static charge (V) | |
|---|---|---|---|
| | | Before washing | After washing |
| 1 | $C_{17}H_{35}CONHC_2H_4N(CH_3)_2C_2H_4OH \cdot ClO_4$ | 30 | 200 |
| 2 | $C_{12}H_{25}N(CH_3)_2C_2H_4OH \cdot ClO_4$ | 50 | 300 |
| 3 | $C_{17}H_{35}CONHC_3H_6N(CH_3)_2C_2H_4OH \cdot NO_3$ | 80 | 700 |
| 4 | $C_{12}H_{25}N(CH_3)_3 \cdot Cl$ | 100 | 800 |
| 5 | Blank | 3,000 | |

The data show that each of the compounds 1–4 gives an excellent before wash anti-static effect. Compounds 1 and 2 according to the above defined application, however, range from 1.5 to better than 3 times superior to the prior art compounds 3 and 4. Moreover, plates having incorporated therein compounds 1 and 2 have a superior retention of the anti-static effect even after prolonged washing. Whereas the anti-static effect of compounds 3 and 4 decreased 9 and 8 times, respectively, that of compounds 1 and 2 decreased 7 and 6 times, respectively. The superior initial anti-static effect of compounds 1 and 2 taken together with the superior retention property, therefore, give plates containing compounds 1 and 2 a vastly superior after wash anti-static effect.

EXPERIMENT V

*Color, heat resistivity and static charge in vinyl chloride-vinyl acetate copolymer*

100 g. samples of clear vinyl chloride-vinyl acetate copolymer ($\bar{p}=450$, PVAC content=12%) suitable for production of records were blended with 3 g. of dibutyltin maleate and 1.2 g. of compounds 1 and 3 of Table 14. The resultant compositions were rolled at 135° C. for five minutes and pressed into plates under 10 atmospheres at 150° C. for one minute and then under 100 atmospheres at 150° C. for one minute. The color change of these samples is recorded in Table 15 as is heat resistivity (length of time to turn black at 150° C. in an oven). Also recorded in Table 15 are the before and after water washing static charge results for each plate measured under conditions as set forth in Experiment IV. All testing was also made against a blank copolymer.

*Table 15*

| Compound in Table 14 | Color change | Heat resistivity time to blacken (min.) | Static charge (V) | |
|---|---|---|---|---|
| | | | Before wash | After wash |
| 1 | None | 80 | 10 | 25 |
| 3 | Yellow | 10 | 10 | 35 |
| Blank | None | 100 | 700 | 800 |

The data of Table 15 show a clear superiority of the plate containing compound 1 according to the above defined application in all respects in comparison to compound 3 of the prior art.

What I claim is:

1. A high molecular weight polymeric material normally having a tendency to accumulate a static charge of electricity thereon having associated therewith, at least on the outer surfaces thereof, as an anti-static agent about 0.2–15% by weight of a quaternary ammonium perhalogenate having the general formula:

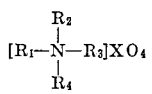

in which X is a halogen; $R_1$ is a member selected from the group consisting of alkyl, alkyl carboxyamido and N-lower alkyl substituted alkyl carboxyamido radicals in which the alkyl has at least 6 carbon atoms; $R_2$ and $R_4$ are members selected from the group consisting of hydrogen and lower alkyl radicals; and $R_3$ is a lower hydroxyalkyl radical.

2. A high molecular weight polymeric material according to claim 1 in which the anti-static agent has the formula

3. A high molecular weight polymeric material according to claim 1 in which the anti-static agent has the formula

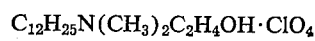

References Cited by the Examiner

UNITED STATES PATENTS

| | | | |
|---|---|---|---|
| 2,256,958 | 9/1941 | Muskat | 260—567.7 |
| 2,299,782 | 10/1942 | Allen et al. | 260—567.6 |
| 2,626,876 | 1/1953 | Carnes | 117—138.8 |
| 2,626,877 | 1/1953 | Carnes | 117—138.8 |
| 2,897,170 | 7/1959 | Gruber | 260—567.6 |
| 3,011,918 | 12/1961 | Silvernail | 117—201 |
| 3,082,227 | 3/1963 | Sherr | 260—404.5 |

FOREIGN PATENTS

| | | |
|---|---|---|
| 73,781 | 12/1953 | Netherlands. |
| 842,842 | 7/1960 | Great Britain. |

OTHER REFERENCES

Myer et al.: Ber. Deut. Chem., vol. 54, pp. 2274–2279 (1921). (Copy in Patent Office Science Library.)

Zissman Comptes Rend., vol. 238, pp. 1843–5 (1954). (Copy in Patent Office Science Library.)

Bihan et al.: C.A., vol. 43, pp. 6977–78 (1949).

Nisbet et al.: C.A., vol. 43, p. 3540b (1950).

WILLIAM D. MARTIN, *Primary Examiner.*

T. G. DAVIS, *Assistant Examiner.*